(12) United States Patent
Norton et al.

(10) Patent No.: US 9,775,367 B2
(45) Date of Patent: Oct. 3, 2017

(54) LOW FAT CHOCOLATE

(75) Inventors: Ian Timothy Norton, Rushden (GB); Philip William Cox, Stourbridge (GB); Benjamin Jean Didier Le Reverend, Banbury (GB); Jennifer Elizabeth Norton, Rushden (GB)

(73) Assignee: The University of Birmingham, Birmingham (GB)

( * ) Notice: Subject to any disclaimer, the term of this patent is extended or adjusted under 35 U.S.C. 154(b) by 422 days.

(21) Appl. No.: 13/261,084

(22) PCT Filed: Jun. 15, 2010

(86) PCT No.: PCT/GB2010/001170
§ 371 (c)(1),
(2), (4) Date: Mar. 23, 2012

(87) PCT Pub. No.: WO2010/146350
PCT Pub. Date: Dec. 23, 2010

(65) Prior Publication Data
US 2012/0177801 A1 Jul. 12, 2012

(30) Foreign Application Priority Data

Jun. 15, 2009 (GB) .................................. 0910358.1
Jun. 2, 2010 (GB) .................................. 1009229.4

(51) Int. Cl.
*A23L 1/03* (2006.01)
*A23G 1/32* (2006.01)
(Continued)

(52) U.S. Cl.
CPC .................. *A23G 1/32* (2013.01); *A23G 1/40* (2013.01); *A23G 1/50* (2013.01); *A23L 29/256* (2016.08);
(Continued)

(58) Field of Classification Search
CPC .......... A23V 2002/00; A23V 2200/222; A23V 2250/1842; A23V 2250/5036;
(Continued)

(56) References Cited

U.S. PATENT DOCUMENTS 5,932,277 A 8/1999 Dubberke ...................... 426/631
5,965,179 A 10/1999 Ducret et al. ................... 426/72
(Continued)

FOREIGN PATENT DOCUMENTS

EP 1714559 A1 * 10/2006
WO WO 2008003538 A2 * 1/2008

OTHER PUBLICATIONS

Norton et al, Development and Characterisation of Tempered Cocoa Butter Emulsions Containing up to 60% Water, J. of Food Engineering, 95 (2009) 172-178.

*Primary Examiner* — Jyoti Chawla
(74) *Attorney, Agent, or Firm* — Ohlandt, Greeley, Ruggiero & Perle, L.L.P.

(57) ABSTRACT

The application describes comestible products comprising a water-in-oil emulsion, the water-in-oil emulsion comprising cocoa butter and a fat-crystal stabilised aqueous phase dispersed substantially through the cocoa butter continuous phase and optionally one or more additional ingredients of chocolate.

Hydrocolloids, such as gelative or carrageenan are typically used to stabilise the aqueous phase.

Methods of making comestible products are also provided.

10 Claims, 2 Drawing Sheets

(51) Int. Cl.
    *A23G 1/40*     (2006.01)
    *A23G 1/50*     (2006.01)
    *A23L 29/256*     (2016.01)
    *A23L 29/281*     (2016.01)

(52) U.S. Cl.
    CPC ......... *A23L 29/284* (2016.08); *A23V 2002/00* (2013.01)

(58) Field of Classification Search
    CPC .... A23V 2200/3324; A23G 1/32; A23G 1/40; A23G 1/30; A23G 1/00; A23G 1/50; A23L 1/0562; A23L 29/256; A23L 29/284
    USPC ................................. 426/660, 593, 573, 575
    See application file for complete search history.

(56) References Cited

U.S. PATENT DOCUMENTS

| | | | |
|---|---|---|---|
| 6,159,526 A | 12/2000 | Morikawa et al. | 426/611 |
| 2005/0118327 A1 | 6/2005 | Best et al. | 426/660 |
| 2008/0206426 A1 | 8/2008 | Rousset et al. | 426/576 |
| 2008/0213412 A1* | 9/2008 | Yamada | 424/757 |
| 2008/0241335 A1 | 10/2008 | Rey et al. | 426/575 |
| 2009/0291170 A1 | 11/2009 | Rousset et al. | 426/101 |

* cited by examiner

LOW FAT CHOCOLATE

This patent Application is a U.S. National Phase Patent Application from PCT Application No. PCT/GB2010/001170 filed Jun. 15, 2010 and claiming priority from Great Britain Patent Application Nos. 0910358.1 filed Jun. 15, 2009 and 1009229.4 filed 2 Jun. 2010.

FIELD OF THE INVENTION

The present invention relates to comestible products comprising water-in-oil emulsions containing cocoa butter, such as chocolate containing products. Such emulsions additionally comprise an aqueous phase dispersed through the cocoa butter stabilised with a hydrocolloid, optionally comprising additional chocolate ingredients. Methods of producing such products are also described.

Particularly in the West, obesity is a major cause for concern. Health conscious consumers are increasingly looking for products that have low fat and calorific content. However, they are often not prepared to accept healthier alternatives that have poor (or even different) taste and/or texture to the traditional products. Thus, food manufacturers face the problem of making low fat alternatives to some of the consumers' favourite products that not only taste as good but that also give the same texture and sensation in the mouth when eaten. Fat plays an important role in giving products their distinctive texture as well as taste. Although fat can be removed and/or substituted to produce a healthier product, if it does not have the same organoleptic properties as the equivalent "full fat" alternative it may not meet with customer acceptance. Moreover, many consumers are not prepared to pay a premium for a low fat alternative, it therefore being important that any new products can be manufactured in a cost effective manner.

Chocolate is a suspension of non-fat particles (sugar, cocoa solids and milk solids) in a continuous fat phase (cocoa butter). Conventional chocolate contains 30-40% fat, from both milk fat and cocoa butter. In chocolate the fat gives desirable physical characteristics, such as snap, gloss, creamy texture, rich taste and melt-in-the-mouth quality.

Chocolate manufacturers have tried to reduce the fat content of their products. U.S. Pat. No. 5,932,277 describes the use of lecithin as an emulsifier to assist to replace some of the fat content.

The production of low fat chocolate has presented particular problems. Work has focused on the introduction of water droplets into the chocolate to replace a proportion of the fat content. However, the water content of the chocolate has been found to migrate to the surface causing a "bloom" appearance that is unacceptable to consumers and results in deterioration of the product. It has also proved difficult to reproduce the mouth sensation that consumers expect with previous low fat chocolates typically being too brittle when bitten into.

SUMMARY OF THE INVENTION

The inventor has found that it is possible to incorporate water into cocoa butter, optionally mixed with other ingredients of chocolate but excluding sugar, by trapping the water using fat crystal shells, which osmotically separate the water and the sugar. The inventor has further found that incorporating a hydrocolloid into the water phase gives improved processing to keep the fat continuous at high water contents and gives stability to the water particles if the droplets are broken when the chocolate is snapped so the water isn't detected by the consumer. Moreover, the utilisation of a hydrocolloid has also been found to give similar melting properties to cocoa butter, resulting in similar eating qualities, such as mouth feel. The addition of, for example, 10% water into the cocoa butter emulsion gives a 3% water content, and therefore a 3% fat reduction in a chocolate comprising 30% cocoa butter emulsion.

A first aspect of the invention provides a comestible product comprising a water-in-oil emulsion, the water-in-oil emulsion comprising cocoa butter and a fat-crystal stabilised aqueous phase dispersed substantially through the cocoa butter continuous phase and optionally one or more ingredients of chocolate.

Accordingly, a further aspect of the invention provides a comestible product comprising a water-in-oil emulsion, the water-in-oil emulsion comprising cocoa butter and a hydrocolloid-containing aqueous phase dispersed substantially throughout the cocoa-butter continuous phase. One or more other ingredients of a chocolate product may optionally be mixed with the cocoa butter and/or the aqueous phase during emulsification. These will usually exclude hydrophilic or osmotically active ingredients such as sugar during emulsion formation. Such hydrophilic or osmotically active ingredients may be added after emulsion formations.

A further aspect to the invention provides a method of making a comestible product, comprising mixing together cocoa butter optionally with at least one other ingredient of chocolate and a hydrocolloid-containing aqueous phase to produce a water-in-oil emulsion.

Typically cocoa solids and/or milk powder are mixed with the cocoa butter prior to emulsification. These assist in fat-crystal formation. Other vegetable fats may also be added.

The mixture of the cocoa butter, aqueous phase and optionally one or more other chocolate ingredients typically produces a hydrocolloid-containing aqueous phase, stabilised by fat crystals in a water-in-oil emulsion.

Typically hydrophilic or osmotically active compounds, such as sugar, are added to the mixture after the formation of the water-in-oil emulsion and are dispersed in the emulsion.

One or more ingredients such as cocoa solids, flavourings and/or milk solids may be mixed with the cocoa butter and aqueous phase before, during or after, typically before emulsion formation.

Comestible products are products fit to be eaten as food. That is, they are edible products, such substances being suitable for use as food and that may be eaten, drunk or otherwise taken into the body.

The comestible product may be a confectionery product. It may be chocolate or a product coated with chocolate.

Emulsions are mixtures of two or more immiscible liquids. One liquid (in this case the aqueous phase), is dispersed in the other (the continuous phase) which in the currently claimed invention is cocoa butter optionally with one or more other ingredients of chocolate.

Cocoa butter is also called theobroma oil or theobroma cocoa. It is a pale-yellow, edible vegetable fat extracted from cocoa. The most common form of cocoa butter has melting point of around 34-38° C., rendering chocolate a solid at room temperature that readily melts once inside the mouth. Cocoa butters displays polymorphism having different crystals with different melting points. Cocoa butter and its various types of crystals are generally known in the art.

During the emulsification process it is believed that water droplets become encapsulated in a fat layer which crystallises on cooling to form a stable shell around the water droplet. Cocoa butter forms a number of crystal forms with type V being the preferred form in chocolate products. If the fat crystals are held at a temperature just below the melting temperature of the type V crystals a tempering process takes place where the crystals of types I to IV will be melted leaving only the type V crystals. The type V crystals then seed the growth of further type V crystals until a complete crystal shell comprising type V crystals is formed. The rate of this sintering process in the crystal shells will be determined by temperature with the rate increasing with decreasing temperature.

Hydrocolloids have colloid particles spread through water. They typically form a gel with the water to give a mechanical rigidity to the water droplets.

Hydrocolloids in foods are generally known in the art. These include agar, carrageenan (such as iota and kappa forms) and pectin. The hydrocolloid may be gelatine. Gelatine may be produced by hydrolysis of proteins of bovine, fish or porcine origin. The gelatine utilised may be porcine. It may be high gel strength grade (250 g bloom). A mixture of hydrocolloids may be used.

The aqueous phase may comprise 70%-99.9%, 70%-98% (preferably 85%-99.8% or 85%-95%) by weight water and 0.1%-30%, 2%-30% (preferably 5%-15%) by weight of hydrocolloid. If carrageenan agar or gellan gum are used then the amount of hydrocolloid may be 0.2%-1% be weight.

The cocoa butter may comprise 0.1% to 10% by weight, emulsifier, preferably 0.5% to 6%, or 1% to 5%.

The emulsifier is preferably polyglycerol polyricinoleate (PGPR) emulsifier. PGPR (E476) is an emulsifier made from castor beans that reduces the viscosity of chocolate, making it easier to work during processing. This has been found to have good properties. Lecithin may also be used.

Comestible products may additionally comprise within the water-in-oil emulsion, one or more additional components selected from milk powder and/or cocoa powder and optionally sweeteners, flavourings, fruits, nuts, biscuit particles, candy particles and/or colourings. Such components may be incorporated into one or more of the cocoa butter, hydrocolloid-containing aqueous phase before mixing or the mixture of the cocoa butter and hydrocolloid-containing aqueous phase.

Such components are generally known in the making of chocolate.

Sugars may be mono-, di- and/or poly-saccharides. These include glucose, fructose, sucrose, lactose, maltose, trehalose, cellobiose or maltodextrins. Sweeteners include saccharine and aspartame. Flavourings include, for example, vanilla essence.

Sugar is typically not added until after the oil-in-water emulsion has been formed from the cocoa butter and aqueous phase and, preferably, cocoa solids for a dark chocolate and milk solids if a milk chocolate is required.

Such additional components are generally known in the art.

The inventors have found that the stability of the water-in-oil emulsion is improved by minimising the amount of material, including sugar that is added after the emulsion is formed. If the osmotically active ingredients such as sugar are added after the emulsion is formed the water droplets are encapsulated in the fat crystal shells which osmotically separates the water and sugar, thereby preventing the water from softening the sugar and maintaining the solid content of the comestible product and physical properties such as snap.

After emulsification, further ingredients such as sugar, sweeteners, flavourings, fruits, nuts, biscuit particles, candy particles and/or colourings can be added to the emulsion mixture by a process of gentle mixing to give a chocolate product.

It has been found that when the solid particles of cocoa powder are present with the cocoa butter they can be induced to enter the interface between the oil and water and thus act as Pickering stabilisers for the emulsion providing greater stability to the emulsion which can result in increased weight of water being introduced into the emulsion.

Typically the cocoa butter emulsion is 20-40%, more typically 30% by weight of the total weight of emulsion, sugar, milk powder and cocoa powder used.

Typically the aqueous phase constitutes 3%-50% or 10%-50% by weight of the total weight of the comestible product.

To produce the comestible product, cocoa butter may be heated (optionally with an emulsifier) and mixed with heated hydrocolloid-containing aqueous phase to produce a heated mixture. Typically the mixture is heated to 60° C. in order to melt all six forms of cocoa butter crystals. This temperature is typically maintained during the mixing with the aqueous phase. This pre-emulsion mix may then be pumped through, for example, a margarine line. Margarine lines are generally known in the art. They typically comprise a scrape surface heat exchanger and pin stirrer (see FIG. 1).

The heated mixture may be allowed to cool to a controlled temperature to allow types IV and type V fat crystals to form. This is typically at approximately 25° C. For example, the scrape surface heat exchanger may be kept at approximately 20° C. to allow the cocoa butter to cool and the pin stirrer kept at 30° C. to melt any type IV crystals, leaving just type V crystals. Such a temperature profile ensures that shells are formed with the required fat crystal structure.

The device used to produce the products, such as a pin stirrer may be maintained at a temperature close to the melting temperature of the cocoa butter fat crystals that form the shell to allow the type V crystals to seed further growth of the type V form and to sinter together to form an intact crystal shell. The sintering can be enhanced by a slight temperature cycle in the order of 2° C. at a temperature within 5° C. to 10° C. below the crystal melting temperature. An advantage of these conditions is that it induces the desired type V crystalline form thus removing the need to temper.

If the temperature for forming the crystal shells is too high then the crystals melt and are no longer present at the interface with the water droplet and the shell properties are lost resulting in an unstable water-in-oil emulsion. Having the Pickering particles present at the interface helps to maintain the emulsion in the event that the fat crystals are melted in this stage.

If the temperature for formation of the fat crystals is too low then the solubility of the crystals in the oil phase is too low so sintering occurs very slowly or is stopped altogether resulting in a reduced stability for the water-in-oil emulsion.

The chocolate product can be maintained at a temperature below the melting point of the cocoa butter fat crystals for transportation without any deterioration in the stability of the water-in-oil emulsion.

The product according to the invention is a reduced-fat product. The presence of water reduces the amount of cocoa butter required.

BRIEF DESCRIPTION OF THE DRAWINGS

The invention will now be described by way of example only with reference to the following figures.

DETAILED DESCRIPTION OF THE INVENTION

Figure 1:
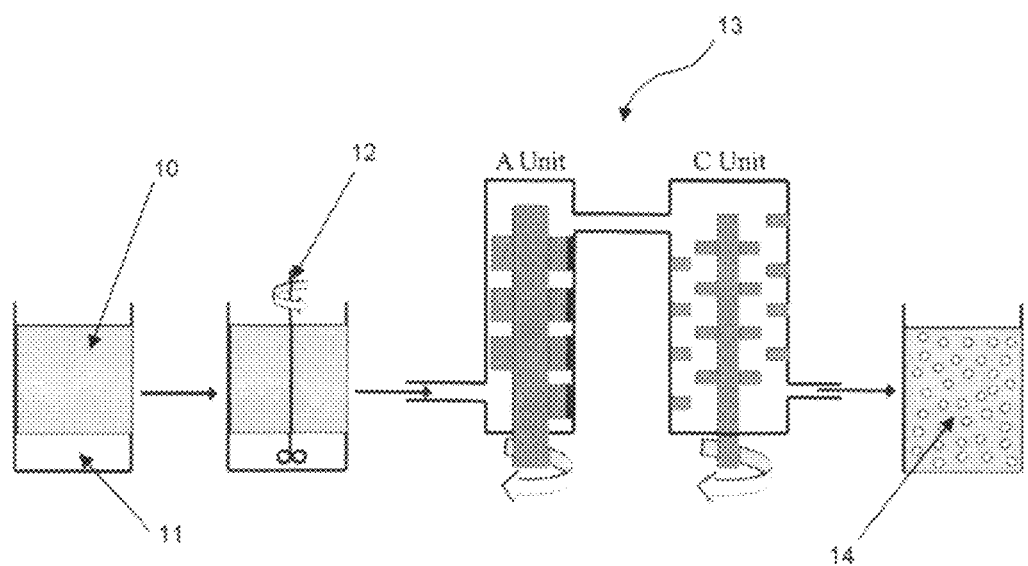
FIG. 1 is a schematic diagram of the process for producing the water-in-oil cocoa butter emulsion.

FIG. 1 shows a schematic diagram of the equipment used to produce the water-in-oil cocoa butter emulsion. A heated cocoa butter and polyglycerol polyricinoleate emulsifier (PGPR) mixture 10 is added to the heated aqueous phase comprising water and hydrocolloid 11 and then stirred using an overhead stirrer 12 for a period of approximately 5 minutes until the mixture is homogeneous. The cocoa butter and PGPR mixture was heated using a water bath (not shown) to a temperature of 60° C. in order to melt all six forms of cocoa butter crystals and this temperature was maintained during mixing with the aqueous phase. This pre-emulsion mixture is then pumped through the margarine line 13.

The margarine line 13 comprises a scrape surface heat exchanger (A Unit) and pin stirrer (C Unit). The margarine line is a continuous process in which the temperature of the two jackets can be manipulated so that tempering can occur during the emulsification stage through the control of shear and temperature.

The scrape surface heat exchanger was kept at 20 degrees C., which allowed the cocoa butter to cool to approximately 25 degrees C., allowing crystal types IV and V to form. The pin stirrer is kept at 30 degrees C. to melt any type IV crystals, leaving just type V crystals. Both the scrape surface heat exchanger and pin stirrer are fitted with water baths (not shown) so the temperature can be altered to optimise the resulting chocolate product that is tempered.

The resulting water-in-oil cocoa butter emulsion 14 then has sugar or other further ingredients added for the production of chocolate. These further ingredients are added by a suitable stirring process and can include but are not limited to sugar, milk powder and cocoa powder.

In certain varieties of chocolate additional ingredients might be required, such as sweeteners, flavourings, fruit, nuts and/or biscuit particles. The sweeteners and flavourings can be added to the aqueous phase and/or the cocoa butter emulsion and/or the chocolate mixture.

The chocolate mixture is then poured into the required shapes before cooling, removal from the mould and wrapping for storage and retail distribution. Alternatively, the mixture can be transferred to a sealable storage container in which it can be cooled and stored under refrigerated conditions for later use.

If necessary, the chocolate can be maintained at a temperature below the melting point of the cocoa butter fat crystals for transportation without any deterioration in the stability of the water-in-oil emulsion.

The sugar, milk powder and cocoa powder are selected with a particle size that gives the required texture in the chocolate. If the particle sizes are too large the chocolate will have a gritty texture. Smaller particle sizes result in a smoother texture.

Cocoa butter is known to have at least five crystal forms, each of which have different melting points. Although the thermodynamically stable form is Form VI, consumers find Form V ($\beta_2$) the most attractive, as it melts between 32 and 34° C. (mouth temperature). Furthermore, the Form V fat crystal network allows chocolate to snap, and provides the glossy appearance preferred by consumers.

Figure 3:
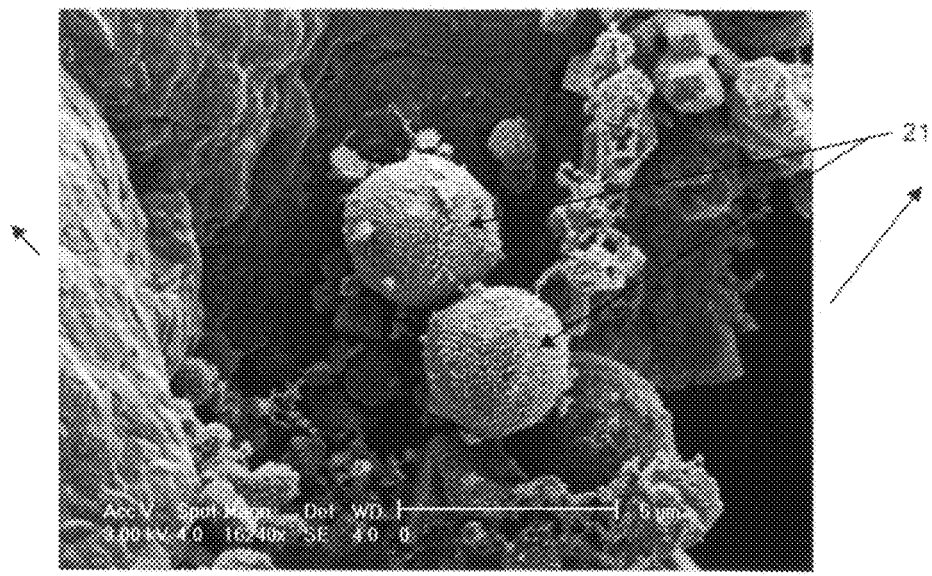

Scanning Electron Microscope images (FIG. 3) showing fat crystal shells in a chocolate product. The fat crystal shells surround the water and hydrocolloid to retain the water inside the shell 21, thereby osmotically separating the water from other ingredients in the chocolate.

EXAMPLE 1

Firstly a cocoa butter emulsion was made comprising 20% aqueous phase (made up of 10% gelatine and 90% water) and 80% lipid phase (made up of 96% cocoa butter and 4% polyglycerol polyricinoleate (PGPR)). The water used to make up the aqueous phase was distilled water. The source of the gelatine was porcine skin (Fluka) and was a high gel strength grade (250 g bloom). The cocoa butter used was a commercial grade. The PGPR was supplied by Kerry Bio-Science.

The cocoa butter and PGPR were heated together using a water bath to a temperature of 60 degrees C., in order to melt all six forms of cocoa butter crystals. The gelatine was dissolved in the water using a magnetic heater-stirrer. The aqueous phase was then added to the cocoa butter and PGPR mixture and stirred for 5 minutes using an over-head stirrer fitted with an anchor head until the mixture looked homogeneous. This pre-emulsion was then pumped through a bench-top margarine line comprising a scrape surface heat exchanger followed by a pin stirrer. Both the scrape surface heat exchanger and pin stirrer units are fitted with water baths so temperature of each unit can be altered to result in a chocolate product that is tempered.

Further ingredients required for the chocolate were then added to the emulsion and mixed by stirring to give a homogeneous mixture with the following composition:

| | |
|---|---|
| Cocoa butter emulsion | 30% |
| Sugar | 35% |
| Milk Powder | 28% |
| Cocoa Powder | 7% |

The ingredients selected for this example were readily available commercial products. The sugar was Silver Spoon icing sugar (ingredients icing sugar and tricalcium phosphate) from Silver Spoon Ltd. UK. The milk powder was Marvel Original Dried Skimmed Milk Powder (ingredients dried skimmed milk 99.5% and vitamins A & D) from Premier Foods Ltd. The cocoa powder used was Cadbury Bournville Cocoa (ingredients cocoa powder) from Cadbury Ltd. Bournville, Birmingham, UK.

After mixing the bulk of the chocolate mixture was transferred to a sealable storage container for storage in a refrigerator. After a period of 2 months the chocolate showed no sign of bloom formation, indicating that no migration of the water content had taken place.

Figure 2:
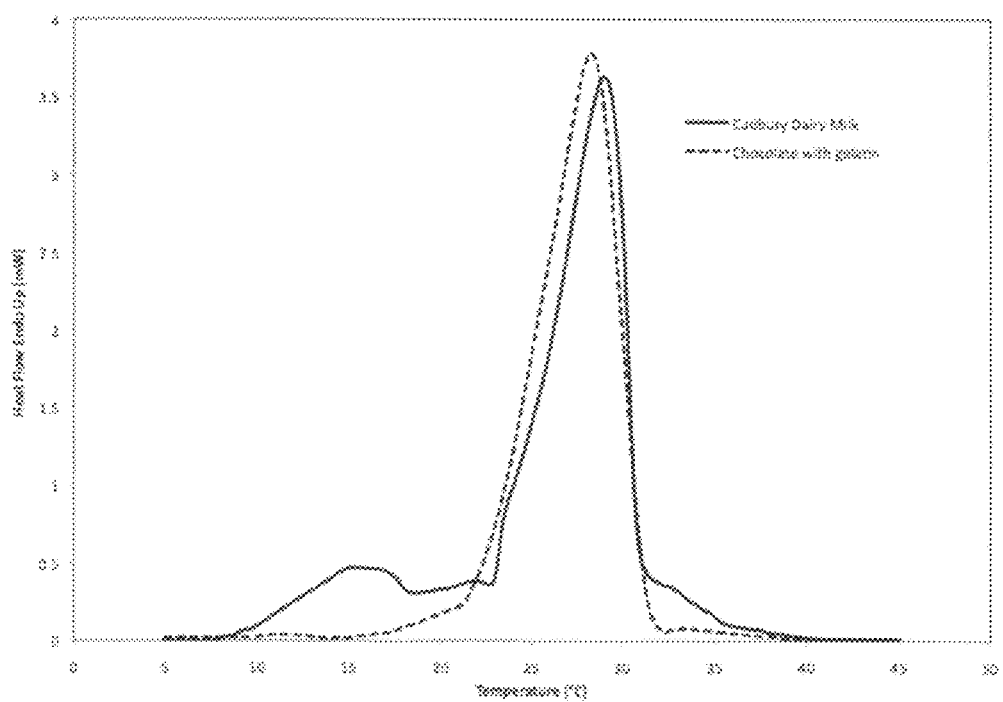
FIG. 2 is a graph showing Differential Scanning Calorimetry measurements of melting temperature for a chocolate product of the invention FIG. 3 show an SEM micrograph of fat crystal shells surrounding a water particle in a chocolate product.

A sample of the chocolate was taken for melting point determination using Differential Scanning Calorimetry (DSC). The results for the DSC test are shown in FIG. 2 and indicate that the example chocolate with gelatine had a melting point close to that of a popular commercial brand ("Cadbury Dairy Milk, Cadbury Ltd. Bourneville, Birmingham, UK), an important feature for mouth feel in such products.

EXAMPLE 2

A low calorie chocolate was made by first making a water in cocoa butter emulsion with a water content of 20%

To make the water in cocoa butter emulsion an aqueous phase was made by adding 2% gelatin to 98 g of distilled water. The distilled water was heated to 60° C. and the gelatin was dissolved in the water using a magnetic heater-stirrer and slowly adding the gelatin while the mixture was stirred. The source of the gelatin was porcine skin (Fluka) and was a high gel strength grade (250 g bloom)

A fat phase was made up of cocoa liquor (52% cocoa butter and 48% cocoa solids) and 1% PolyGlycerol PolyRicinoleate (PGPR) dispersed through the mixture. This fat phase was heated to 60° C. using a water bath and a cocoa butter emulsion was prepared by adding the aqueous phase to the fat phase mixture and stirred for 5 minutes to produce a pre-emulsion using an over-head stirrer fitted with an anchor head until the mixture looked homogeneous.

The pre-emulsion was then emulsified in a high shear mixer (Silverson L4RT, 5000 rpm, 5 mins) to produce a fine water-in-oil emulsion with water droplets with a size of approximately 3 µm.

The emulsion mixture was then mixed with sugar at 27° C. to produce a full chocolate and cooled to room temperature or 5° C. The sample was checked using a DSC and was found to be tempered with a Form V fat crystal network structure for the cocoa butter corresponding to a melting point of 32° C. for an acceptable mouth feel. The resulting chocolate was found to have a glossy surface appearance and snapped as expected for a dark chocolate.

EXAMPLE 3

Example 2 was repeated but the emulsification process was carried out in a scrape surface heat exchanger (SSHE) and a pin stirrer at temperatures of 20° C. and 27° C. respectively. This resulted in a water droplet size of 2 µm to 3 µm. The resulting emulsion was then mixed with icing sugar at 27° C. in a 50:50 ratio by weight to produce a full chocolate before cooling to room temperature.

The resulting dark chocolate was glossy and snapped, with an effective 12% calorie reduction.

EXAMPLE 4

Example 3 was repeated with a ratio of water to cocoa liquor of 40% to 60%. The droplet size obtained was in the range 3 µm to 4 µm. The resulting emulsion was mixed with milled sugar in a 50:50 mixture to produce a full chocolate. The mixture was cooled to room temperature or 5° C. Again, the desired Form V fat crystal network structure with a melting temperature of 32 C was produced and the chocolate was glossy and snapped.

The resulting dark chocolate was glossy and snapped, with an effective 24 to 36% calorie reduction.

EXAMPLE 5

Example 2 was repeated but instead of using gelatin in the aqueous phase no hydrocolloid was added.

It was found that the resulting chocolate was glossy but did not snap as well as the samples containing a hydrocolloid.

EXAMPLE 6

Example 2 was repeated with the aqueous phase containing 0.5% kappa carrageenan as a replacement for the gelatin. Macro and micro structural properties were similar to that of example 2.

EXAMPLE 7

Example 6 was repeated with the aqueous phase containing 0.5% iota carrageenan as a replacement for the kappa carrageenan. Macro and micro structural properties were similar to that of example 2.

EXAMPLE 8

Example 3 was repeated in which the gelatin in the aqueous phase was replaced with 0.5% kappa carrageenan. Macro and micro structural properties were similar to that of example 3.

The invention claimed is:

1. A comestible product comprising a water-in-oil emulsion, the water-in-oil emulsion comprising cocoa butter type V fat-crystal stabilized particles encapsulating an aqueous phase, the type V fat-crystal stabilized particles being dispersed substantially through the cocoa butter continuous phase and one or more additional ingredients of chocolate, wherein the comestible product is made by a method in which cocoa butter is heated, optionally with an emulsifier, and mixed to form a heated mixture, and wherein the heated mixture is cooled to a temperature in the range of about 20° C. to about 30° C. to allow the type V fat-crystal stabilized particles to form.

2. A comestible product according to claim 1, wherein the aqueous phase contains hydrocolloid.

3. A comestible product according to claim 2, wherein the hydrocolloid comprises gelatine or carageenan.

4. A comestible product according to claim 1, wherein the continuous phase comprises vegetable fats.

5. A comestible product according to claim 1 which is chocolate.

6. A comestible product according to claim 1, wherein the aqueous phase comprises 70%-98%, by weight water and 2%-30% by weight of hydrocolloid.

7. A comestible product according to claim 1 comprising polyglycerol polyricinoleate (PGPR) emulsifier.

8. A comestible product according to claim 1, additionally comprising within the water-in-oil emulsion one or more additional components selected from sugar, milk powder, sweeteners, cocoa powder, flavourings, fruits, nuts, biscuit particles, candy particles and colourings.

9. A comestible product according to claim 1, wherein the type V crystals allow formation of the fat-crystal stabilized particles encapsulating the aqueous phase.

10. a comestible product according to claim 1, wherein the type V crystals allow the comestible product to be maintained at a temperature below the melting point of cocoa butter fat crystals for transportation without any deterioration in stability of the water-in-oil emulsion.

* * * * *